Feb. 24, 1925.	1,527,529
R. STOCK
VEHICLE WHEEL
Filed Dec. 23, 1919
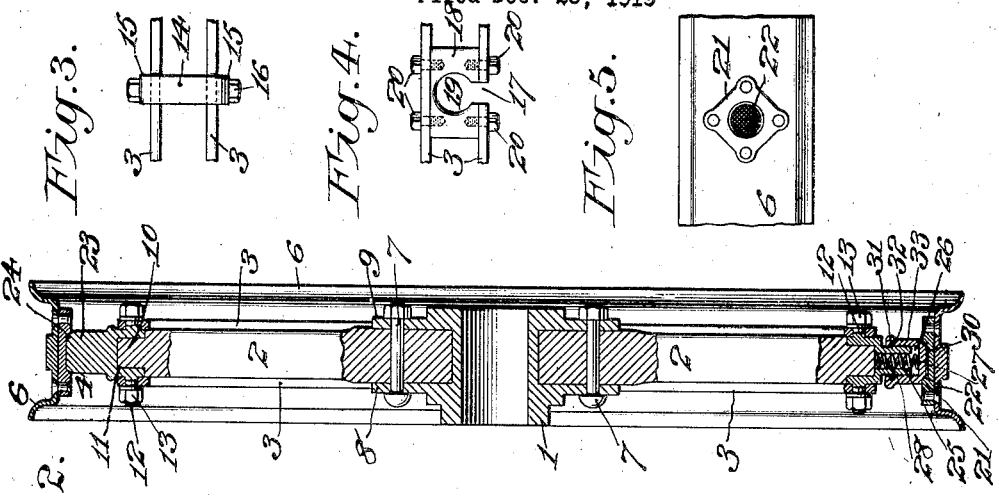
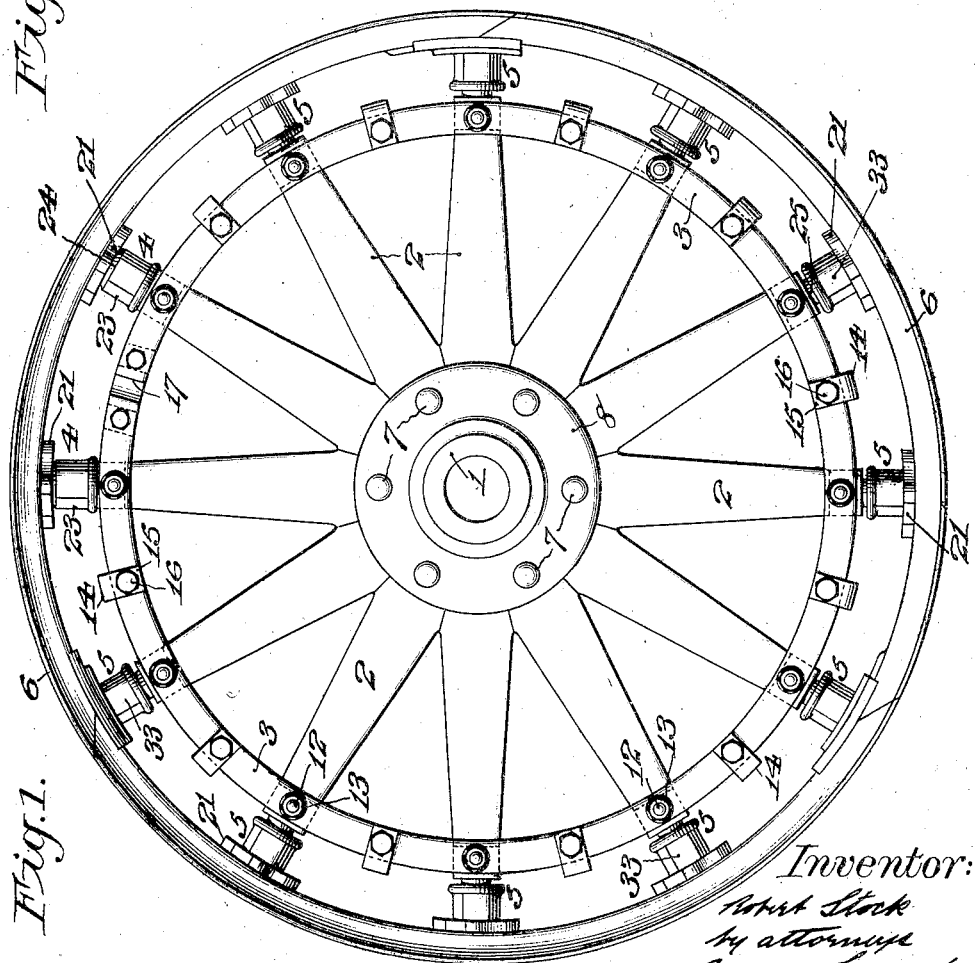
Inventor:
Robert Stock
by attorneys Patented Feb. 24, 1925.

1,527,529

UNITED STATES PATENT OFFICE.

ROBERT STOCK, OF SANDUSKY, OHIO.

VEHICLE WHEEL.

Application filed December 23, 1919. Serial No. 346,887.

*To all whom it may concern:*

Be it known that I, ROBERT STOCK, a citizen of the United States, and resident of the city of Sandusky, in the county of Erie and State of Ohio, have invented a new and useful Improvement in Vehicle Wheels, of which the following is a specification.

This invention relates to improvements in vehicle wheels and has for its object to provide a wheel construction which will be simple, durable and inexpensive to manufacture.

Another object is to provide a wheel construction having means interposed between the spokes and rim for securing the rim in position on the spokes.

Another object is to provide a wheel construction having means for adjustably mounting the rim on the spokes, whereby the rim may be centered with respect to the hub.

Another object is to provide spacers for connecting the spokes and rim, certain of which spacers have movable members, one member of which is secured to the spoke and adapted to receive felly rings, thereby rigidly holding the spokes and rim together.

A still further object is to provide certain improvements in the form, construction and arrangement of the several parts whereby the above named and other objects may be effectively carried out.

A practical embodiment of my invention is represented in the accompanying drawings, in which—

Fig. 1 represents a side elevation of my improved vehicle wheel.

Fig. 2 represents a vertical section taken in the plane of the line II—II of Fig. 1, looking in the direction of the arrows.

Fig. 3 represents a detail plan view of a fragment of the felly rings and the means of securing them together.

Fig. 4 represents a similar view showing the means of securing the felly rings at the valve stem, and Fig. 5 represents a plan view of the plate having a recess for the reception of a spacer for connecting the spoke and rim.

The vehicle wheel consists of a hub denoted by 1, spokes 2 extending outwardly therefrom, felly rings 3, fixed spacers 4, movable spacers 5, and a rim 6.

The spokes 2 extend radially from the hub 1, the inner ends of which spokes are secured to the hub by means of bolts 7 passing through flanges 8 and 9 of the hub. The outer ends of the spokes are reduced, as shown at 10 in Fig. 2, and fitted into sockets 11 of the spacers 4—5. The spacers are provided with laterally extending screw threaded studs 12 upon which are secured the felly rings 3, which are firmly held to the spacers by nuts 13. The felly rings are also secured against outward movement by straps 14 having inwardly directed ends 15 which are fixed to the felly rings by means of bolts 16.

To provide for the insertion of a valve stem of a tire (not shown), one of the felly rings is cut away as shown at 17 and a block 18 having a slot 19 for the stem, is secured between the felly rings by bolts 20.

The rim 6, shown in this instance, is a sectional rim and the subject matter of my copending application Serial No. 325363, filed September 22, 1919, but I do not intend to claim this rim structure herein, nor do I deem it necessary to describe its construction, since a continuous rim may be used equally as well.

To secure the rim in position on the spokes, I provide plates 21 having recesses 22, which plates are riveted or otherwise fastened to the rim at equal distances apart and corresponding radially with the spacers 4—5.

The fixed spacers 4, of which I have shown two, are each formed with a solid body 23 having a reduced portion 24 which enters and rests in its recess 22 in the plate 21.

The movable spacers 5 of which I have shown ten, are each composed of an inner member and an outer member. The inner member is provided with a threaded shank 25 which is adapted to receive a cupped interior threaded portion 26 of the outer member. To urge the outer member outwardly, I provide a spring 27, which is housed in a cavity 28 in the shank 25 of the inner member, one end of which spring rests upon the end of the spoke 2, while the other end bears against the bottom of the cupped portion 26 of the outer member. Thus it will be seen that the function of the spring 27 is to force the members apart or exert a yielding tension on the threaded portions of the members so that the members will not be unintentionally displaced.

The outer member is provided with a reduced portion 29, which is arranged to seat in its recess 22 in the plate 21. In order that the reduced portions 29 of the outer member are afforded a firm seat in the recesses 22 in the plates 21, I knurl the bottoms of the recesses and provide certain of the recesses with a thin resilient washer 30.

To prevent dust and dirt from entering between the members, I provide the outer member with an annular recess 31 in which is seated a yielding ring 32, the diameter of which is normally smaller than the diameter of the shank 25 so that when it is in position, the ring will be expanded to hug the shank and thus close the joint between the members. The ring 32 also assists in providing the members with an additional frictional lock to guard against unintentional displacement.

The outer member of each of the spacers 5 is provided with flattened faces as shown at 33, so that a wrench or similar tool may be applied thereto for convenience in turning the member.

To mount a rim on the wheel, the outer members are moved inwardly to the limit of their movement and the rim placed on the fixed spacers 4 at an angle oblique to the vertical center of the wheel so that their reduced portions 24 will engage the recesses 22 of the plates 21, then by swinging the rim into line with the vertical center of the wheel, the outer members of the movable spacers 5, diametrically opposite the fixed spacers 4, may be moved outwardly so as to engage the recesses 22 in the plate 21 adjacent thereto. The remaining outer members of the spacers may now be moved outwardly in turn until all are firmly seated in their recesses, whereupon the rim will be rigidly held in position on the wheel.

While I have shown two fixed spacers and ten movable spacers, it will, of course, be understood that a greater or less number of fixed and movable spacers may be used and still produce an effective structure.

It is obvious that various changes may be resorted to in the form, construction and arrangement of the several parts without departing from the spirit and scope of my invention; hence I do not intend to be limited to the structure herein shown and described, except as set forth in the appended claims.

What I claim is:—

1. A vehicle wheel comprising, a hub, spokes therefor, a tire rim, plates secured to its inner periphery, said plates having recesses, and spacers located on the spokes, each of said spacers being arranged to independently engage its recess for positioning and securing the rim on the spokes.

2. A vehicle wheel comprising, a hub, spokes therefor, a tire rim, and spacers located on the spokes, certain of said spacers comprising inner and outer members, one of said members being fixed on the spokes and the other member arranged to engage the rim for positioning and securing the rim on the spokes.

3. A vehicle wheel comprising, a hub, spokes therefor, a tire rim, spacers located on the spokes, certain of said spacers comprising inner and outer members, one of said members being fixed on the spokes and the other member arranged to engage the rim for positioning and securing the rim on the spokes, and yielding means interposed between said members for forcing them apart.

4. A vehicle wheel comprising, a hub, spokes therefor, a tire rim, spacers located on the spokes, certain of said spacers comprising inner and outer members, one of said members being fixed on the spokes and the other member arranged to engage the rim for positioning and securing the rim on the spokes, and continuous rings secured on opposite sides of the fixed members of the spacers.

5. A vehicle wheel comprising, a hub, spokes therefor, a tire rim, spacers located on the spokes, certain of said spacers comprising inner and outer members in screw threaded engagement, one of said members being fixed on the spokes and the other member arranged to engage the rim for positioning and securing the rim on the spokes, and continuous rings secured on opposite sides of the fixed members of the spacers.

In testimony, that I claim the foregoing as my invention, I have signed my name, this 20 day of December, 1919.

ROBERT STOCK.